US007145161B2

(12) United States Patent
Weast et al.

(10) Patent No.: US 7,145,161 B2
(45) Date of Patent: Dec. 5, 2006

(54) DETECTING LOCATION OF EDGE OF MEDIA SHEET

(75) Inventors: Aaron Weast, Camas, WA (US); Joe Barbera, La Center, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 292 days.

(21) Appl. No.: 10/755,553

(22) Filed: Jan. 11, 2004

(65) Prior Publication Data

US 2005/0151771 A1 Jul. 14, 2005

(51) Int. Cl.
*G01N 21/86* (2006.01)

(52) U.S. Cl. ............................ 250/559.11; 250/559.18; 356/445

(58) Field of Classification Search ........... 250/559.01, 250/559.11, 559.16, 559.29, 32, 234, 559.36, 250/555, 556, 559, 559.18, 559.17; 347/19, 347/20, 32, 38, 41, 101–107, 153, 155, 164, 347/191; 356/445, 446
See application file for complete search history.

(56) References Cited

U.S. PATENT DOCUMENTS

| | | | |
|---|---|---|---|
| 4,019,819 | A | 4/1977 | Lodzinski |
| 4,255,057 | A | 3/1981 | Williams |
| 4,352,988 | A | 10/1982 | Ishida |
| 4,723,072 | A | 2/1988 | Naruse |
| 4,760,271 | A | 7/1988 | Brenholdt |
| 4,931,657 | A | 6/1990 | Houston et al. |
| 5,216,258 | A | 6/1993 | McConnell |
| 5,573,236 | A | 11/1996 | Petocchi et al. |
| 5,821,551 | A | 10/1998 | Roh |
| 5,975,674 | A | 11/1999 | Beauchamp et al. |
| 6,036,298 | A | 3/2000 | Walker |
| 6,291,829 | B1 | 9/2001 | Allen et al. |
| 6,322,192 | B1 | 11/2001 | Walker |
| 6,325,505 | B1 | 12/2001 | Walker |
| 6,352,332 | B1 | 3/2002 | Walker |
| 6,386,669 | B1 | 5/2002 | Scofield et al. |
| 6,557,965 | B1 | 5/2003 | Walker et al. |
| 6,561,643 | B1 | 5/2003 | Walker et al. |
| 6,960,777 | B1 * | 11/2005 | Soar ...................... 250/559.11 |

FOREIGN PATENT DOCUMENTS

| | | |
|---|---|---|
| EP | 1253097 | 10/2002 |
| JP | 2001-063870 | 3/2001 |

OTHER PUBLICATIONS

European Search Report dated Dec. 19, 2005.

* cited by examiner

*Primary Examiner*—Thanh X. Luu
*Assistant Examiner*—Tony Ko

(57) ABSTRACT

A method of one embodiment of the invention is disclosed that detects approachment of an edge of a media sheet by detecting light reflected by the media sheet. Upon detecting the approachment of the edge of the media sheet, the method detects the location of the edge by detecting light transmitted through the media sheet.

30 Claims, 5 Drawing Sheets

DETECTING LOCATION OF EDGE OF MEDIA SHEET

BACKGROUND

Inkjet printers have become popular for printing on media, especially when precise printing of color images is needed. For instance, such printers have become popular for printing color image files generated using digital cameras, for printing color copies of business presentations, and so on. An inkjet printer is more generically an image-forming device that forms images onto media, such as paper.

Full-bleed printing of color images has become especially popular within consumer and home environments, for printing copies of digital photographs, for instance. Full-bleed printing means that printing is accomplished from top end to bottom end, and from left end to right end, on a sheet of media. That is, printing starts immediately at the top and the left ends of the sheet of media, and continues to the bottom and the right ends of the sheet of media. There is thus no margin, "white space," or unprinted-on area on the media sheet surrounding the printed image.

Full-bleed printing can be difficult to accomplish within image-forming devices like inkjet printers, however. To achieve full-bleed printing, an inkjet printer locates the ends of a given sheet of media with precision. Otherwise, there may an unprinted-on area of white space between an end of the media sheet and where printing of the image begins. Alternatively, the printer may overshoot an end of the media sheet, ejecting ink, for instance, within the printer that does not land on the media sheet.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice these embodiments of the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Sensing Mechanism

Figure 1:
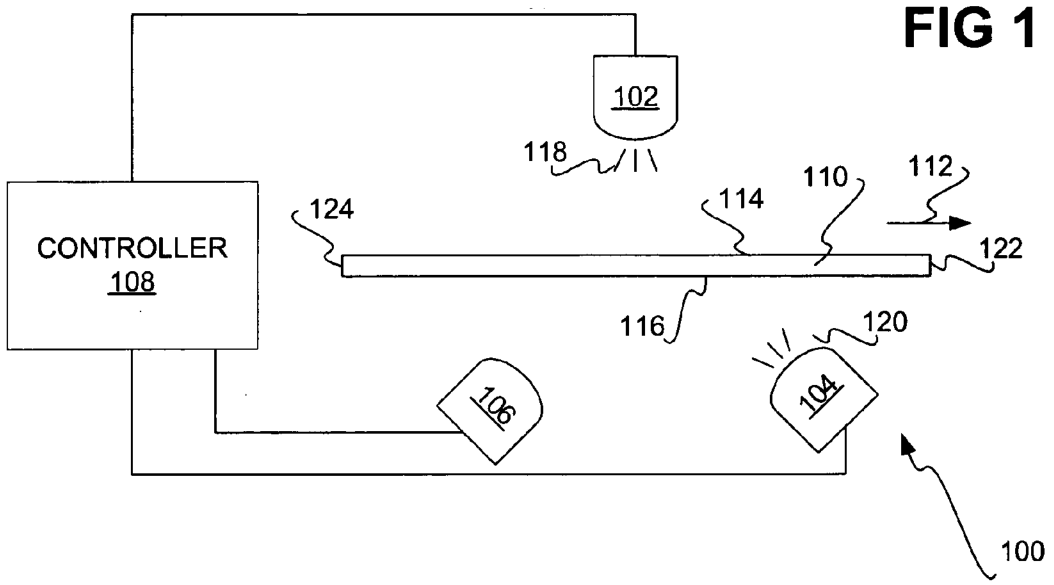
FIG. 1 is a diagram of an embodiment of a sensing mechanism for an image-forming device, according to an embodiment of the invention.

FIG. 1 shows an embodiment of a sensing mechanism 100 for an image-forming device, according to an embodiment of the invention. Media 110 moves through the sensing mechanism 100 from left to right, as indicated by the arrow 112. The media 110 may be plain paper media, bond paper media, transparency media, glossy media, photo media, or another type of media. The sensing mechanism 100 includes light sources 102 and 104, a detector 106, and a controller 108.

The media 110 has a leading edge 122 and a lagging edge 124. The leading edge 122 is the first edge of the media 110 on which the image-forming device forms an image, such as the first edge on which an inkjet-printing device ejects ink. Conversely, the lagging edge 124 is the last edge of the media 110 on which the image-forming device forms an image, such as the last edge on which an inkjet-printing device ejects ink. In other words, the leading edge 122 is the first edge that passes underneath the light source 102, whereas the lagging edge 124 is the last edge that passes underneath the light source 102.

The light sources 102 and 104 may be light-emitting diodes (LED's), or other types of light sources. Each of the light sources 102 and 104 may actually be or include more than one individual light source. The light source 102 emits light 118, whereas the light source 104 emits light 120. The light source 102 is positioned incident to the side 114 of the media 110. The light source 102 may be positioned at a right angle to the side 114 of the media 110. The light source 104 is positioned to the side 116 of the media 110, which is opposite of the side 114 of the media 110. The light source 102 may be positioned at an oblique angle to the side 114 of the media 110.

The detector 106 may be a phototransistor, or another type of light detector or sensor. The detector 106 may actually be or include more than one individual such detector. The detector 106 is also positioned incident to the side 116 of the media 110. The light source 104 and the detector 106 may be positioned in relation to one another in accordance with Snell's Law, such that the angle of incidence is equal to the angle of reflection. The detector 106 detects the light 118 emitted by the light source 102 as transmitted through the media 110. The detector 106 also detects the light 120 emitted by the light source 104 as reflected off the media 110.

The controller 108 may include hardware, software, or a combination of hardware and software. The controller 108 controls the turning on and off the light sources 102 and 104, and receives values from the detector 106 corresponding to the light 118 and 120 detected by the detector 106. The controller 108 may detect approachment of the leading edge

122 and/or the lagging edge 124 of the media 110 based on the light 120 as reflected or scattered by the edge 122 or the edge 124. The controller 108 may further detect, or determine, a more exact or more precise location of the leading edge 122 and/or the lagging edge 124 after the approachment thereof has been detected, based on the light 118 as transmitted through the media 110. The manner by which the controller 108 detects approachment of the leading edge 122 and/or the lagging edge 124, and the location thereof, based on the light 120 and the light 118, is specifically described in subsequent sections of the detailed description.

Detecting Lagging and Leading Edges of Media

Figure 2:
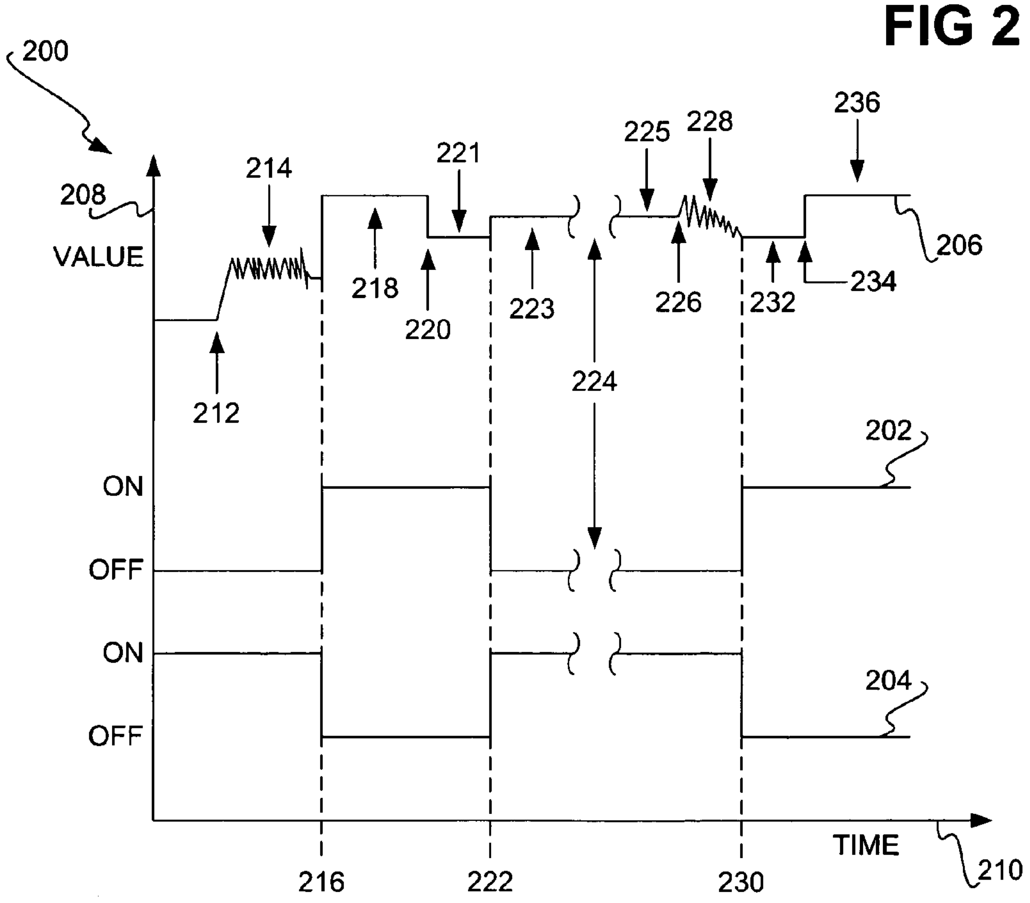
FIG. 2 is a graph showing over time how a transmissive light source and a reflective light source are turned on and off, and how the resulting light emitted therefrom can be detected to detect both approachment of lagging and leading media edges and the locations of these edges, according to an embodiment of the invention.

FIG. 2 shows a graph 200 that shows how detecting the light 120 reflected off the media 110 can be used to detect approachment of the leading edge 122 and the lagging edge 124 of the media 110, and how detecting the light 118 transmitted through the media 110 can be used to more precisely detect the locations of the edges 122 and 124, according to an embodiment of the invention. Time is indicated on the x-axis 210. The y-axis 208 indicates whether the transmissive light source 102 is on or off, as represented by the signal 202, and similarly indicates whether the reflective light source 104 is on or off, as represented by the signal 204. The y-axis 208 further indicates the value detected by the detector 106, as represented by the signal 206, where the value denotes the level of light detected by the detector 106.

At first, the signal 204 indicates that the reflective light source 104 is on and the signal 202 indicates that the transmissive light source 102 is off. The signal 206 shows that little or no light is detected by the detector 106, until at the point indicated by the reference number 212, the signal 206 starts to denote that scattered light, as indicated by the reference number 214, is detected. This corresponds to the light 120 emitted by the reflective light source 104 reflecting off the leading edge 122 of the media 110 as the media 110 is being advanced. Thus, before the leading edge 122 is advanced under the light source 102, the reflective light source 104 is being used to already detect the approachment of the leading edge 122.

Figure 3A:
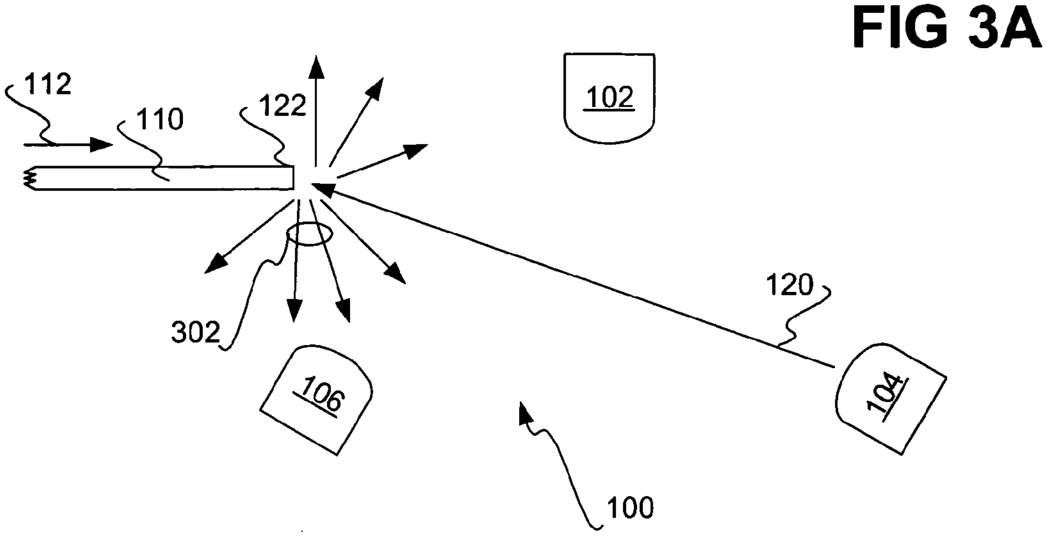
FIG. 3A is a diagram illustratively depicting how the leading media edge scatters or reflects the light emitted by a reflective light source, such that detection of this scattered or reflected light results in detection of the approachment of the leading edge, according to an embodiment of the invention.

FIG. 3A illustratively depicts the light 120 emitted by the light source 104 being reflected, or scattered, by the leading edge 122 of the media 110, according to an embodiment of the invention. For illustrative clarity, the controller 108 is not shown in FIG. 3A. The media 110 is advancing from left to right, as indicated by the arrow 112. At the point corresponding to the reference number 212 in FIG. 2, the light 120 emitted by the light source 104 is reflected off of, or scattered by, the leading edge 122 of the media 110. Some of this light, indicated in FIG. 3A as the reflected light 302, is detected by the detector 106. The level of the reflected light 302 detected corresponds to the value of the signal 206 indicated by the reference number 214 in FIG. 2. The reflected light 302 may vary in value quickly, as indicated by the reference number 214, because the light 302 may be light that is scattered by the leading edge 122.

Referring back to FIG. 2, once approachment of the leading edge 122 of the media 110 has been detected in this manner, the transmissive light source 102, represented by the signal 202, is turned on, and the reflective light source 104, represented by the signal 204, is turned off at a point in time indicated by the reference number 216. The signal 206 immediately increases in value, as indicated by the reference number 218, as the light 118 that is emitted by the transmissive light source 102 reaches the detector 106 without having to pass through the media 110.

Once the leading edge 122 of the media 110 advances underneath the light source 102, the signal 206 decreases in value, as indicated by the reference number 220. This corresponds to the location of the leading edge 122 of the media 110, such that the location of the leading edge 122 of the media 110 is detected. The value of the signal 206 decreases to the level indicated by the reference number 221, because the media 110 is now blocking some of the light 118 emitted by the light source 102, such that not all of the light 118 is reaching the detector 106.

Figure 3B:
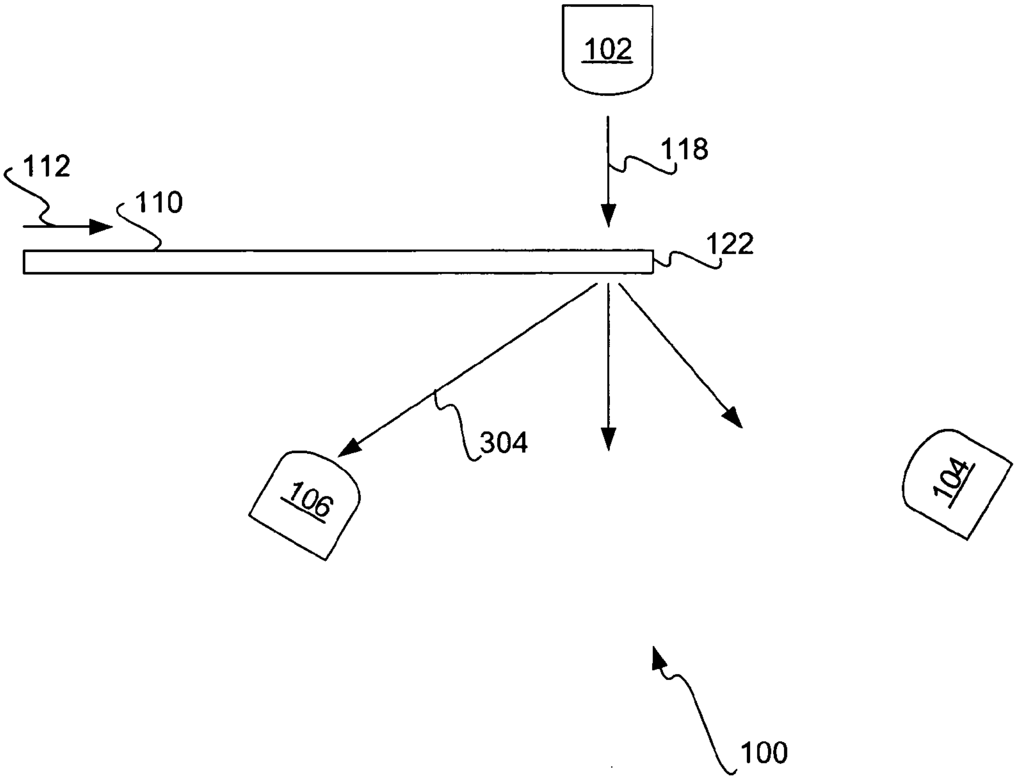
FIG. 3B is a diagram illustratively depicting how the leading media edge transmits the light emitted by a transmissive light source, such that detection of this transmitted light results in detect of the location of the leading edge, according to an embodiment of the invention.

FIG. 3B illustratively depicts the light 118 emitted by the light source 102 being transmitted through the leading edge 122 of the media 110, according to an embodiment of the invention. For illustrative clarity, the controller 108 is not shown in FIG. 3B. The media 110 is advancing from left to right, as indicated by the arrow 112, and has advanced further to the right than as shown in FIG. 3A. At the point corresponding to the reference number 220 in FIG. 2, the light 118 emitted by the light source 102 is transmitted through the leading edge 122 of the media 110. Some of this light, indicated in FIG. 3B as the transmitted light 304, is detected by the detector 106. The level of the transmitted light 304 corresponds to the value of the signal 206 indicated by the reference number 221 in FIG. 2. The amount of the light 118 emitted by the light source 102 detected by the detector 106 is less when the media 110 is between the detector 106 and the light source 102, because the media 110 reflects or blocks some of the light 118.

Referring back to FIG. 2, once the location of the leading edge 122 of the media 110 has been detected in this manner, the transmissive light source 102, represented by the signal 202, is turned off, and the reflective light source 104, represented by the signal 204, is turned on at a point in time indicated by the reference number 222. The signal 206 is shown as increased in value, as indicated by the reference number 223. This occurs where more of the light 120 emitted by the reflective light source 104 is reflected off the media 110 and detected by the detector 106 than the light 118 that was emitted by the transmissive light source 102, transmitted through the media 110, and detected by the detector 106. Depending on the type of the media 110, however, the signal 206 may decrease in value at the point in time indicated by the reference number 222, where less of the light 120 emitted by the light source 104 is reflected off the media 110 than the light 118 that was emitted by the light source 102 and transmitted through the media 110.

It is noted that until the point in time indicated by the reference number 216, the media 110 may be advanced relatively quickly in the direction indicated by the arrow 112. This is so that the media 110 may be quickly advanced close to the position where image formation can begin on the leading edge 122 thereof. Once approachment of the leading edge 122 of the media 110 has been detected, and the reflective light source 104 turned off and the transmissive light source 102 turned on at the point in time indicated by the reference number 216, the media 110 may then be advanced more slowly. This is so that the location of the leading edge 122 of the media 110 can be more precisely detected. Once the location of the leading edge 122 has been detected, and the reflective light source 104 turned on and the transmissive light source 102 turned off at the point in time indicated by the reference number 222, the media 110 may thereafter be advanced at the rate at which image formation is to properly occur on the media 110.

Furthermore, until the point in time indicated by the reference number 216, polling of the detector 106 by the controller 108 to determine the amount of light detected by the detector 106 may occur relatively infrequently. This is because approachment of the leading edge 122 of the media 110 does not have to occur with great precision, and just has to be detected before the leading edge 122 actually passes under the transmissive light source 102. Once approachment of the leading edge 122 has been detected, and the light source 104 turned off and the light source 102 turned on at the point in time indicated by the reference number 216, polling of the detector 106 may occur with greater frequency. This is so that the location of the leading edge 122 can be determined with greater precision, corresponding to the change in light detected by the detector 106, as represented by the signal 206.

The breaks in the signals 202, 204, and 206 indicated by the reference number 224 correspond to the media 110 being advanced and image formation occurring on the media 110. Whereas the reflective light source 104, as represented by the signal 204, is indicated in FIG. 2 as being on during this time, in another embodiment the reflective light source 104 may be turned off until a length of time has passed at which it is believed that approachment of the lagging edge 124 may be detected. However, assuming that the light source 104 remains on, the level of light detected by the detector 106, as represented by the signal 206, remains at the same level, as indicated by the reference number 226 depicting the same level as the reference number 223.

At a point in time indicated by the reference number 226, the detector 106 begins to detect scattering, or reflection, of the light 120 emitted by the reflective light source 104 by the lagging edge 124 of the media 110. This is similar to the situation depicted in FIG. 3A with respect to the leading edge 122 of the media 110, except that the lagging edge 124 coming into view of the light 120 is scattering the light 120. Approachment of the lagging edge 124 of the media 110 is thus detected.

Soon thereafter, at a point in time indicated by the reference number 230, the reflective light source 104 is again turned off, and the transmissive light source 102 is again turned on. The level of light detected by the detector 106 changes to the level indicated by the reference number 232, which is the same as the level of light indicated by the reference number 221. This level of light corresponds to the light 118 emitted by the light source 102 that is transmitted through the media 110 and detected by the detector 106.

Once the lagging edge 124 of the media 110 passes under the transmissive light source 102, at the point in time indicated by the reference number 234, the level of light detected by the detector 106 increases to the level indicated by the reference number 236, which is the same as the level of light indicated by the reference number 218. This level of light corresponds to the light 118 emitted by the light source 102 that is substantially completely detected by the detector 106, since once the lagging edge 124 has passed under the light source 102, there is no part of the media 110 that blocks or reflects the light 118, and more of the light 118 is detected by the detector 106. The location of the lagging edge 124 of the media 110 is thus detected as corresponding to the point in time indicated by the reference number 234.

As before, polling of the detector 106 by the controller 108 may occur relatively infrequently while the reflective light source 104 is on between the points in time indicated by the reference numbers 222 and 230. Once the light source 104 has been turned off, and the transmissive light source 102 turned on, at the point in time indicated by the reference number 230, polling of the detector 106 may occur more frequently, so that the location of the lagging edge 124 of the media 110 can be precisely detected. Furthermore, at the point in time indicated by the reference number 230, media advancement in the direction indicated by the arrow 112 may slow, to further aid determining the exact location of the lagging edge 124 with precision.

Method and Image-Forming Device

Figure 4A:
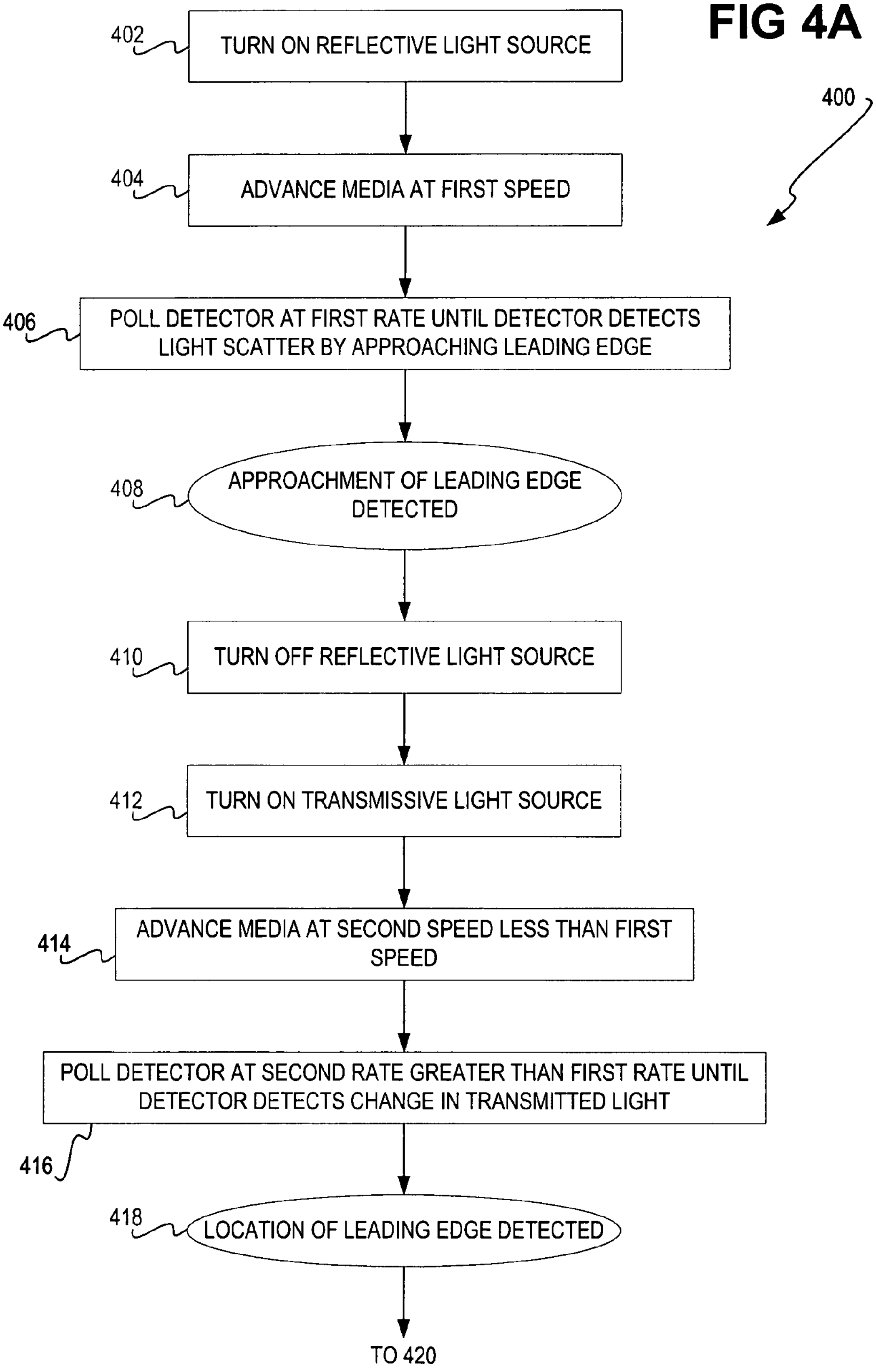
FIGS. 4A and 4B are flowcharts of a method, according to an embodiment of the invention.
Figure 4B:
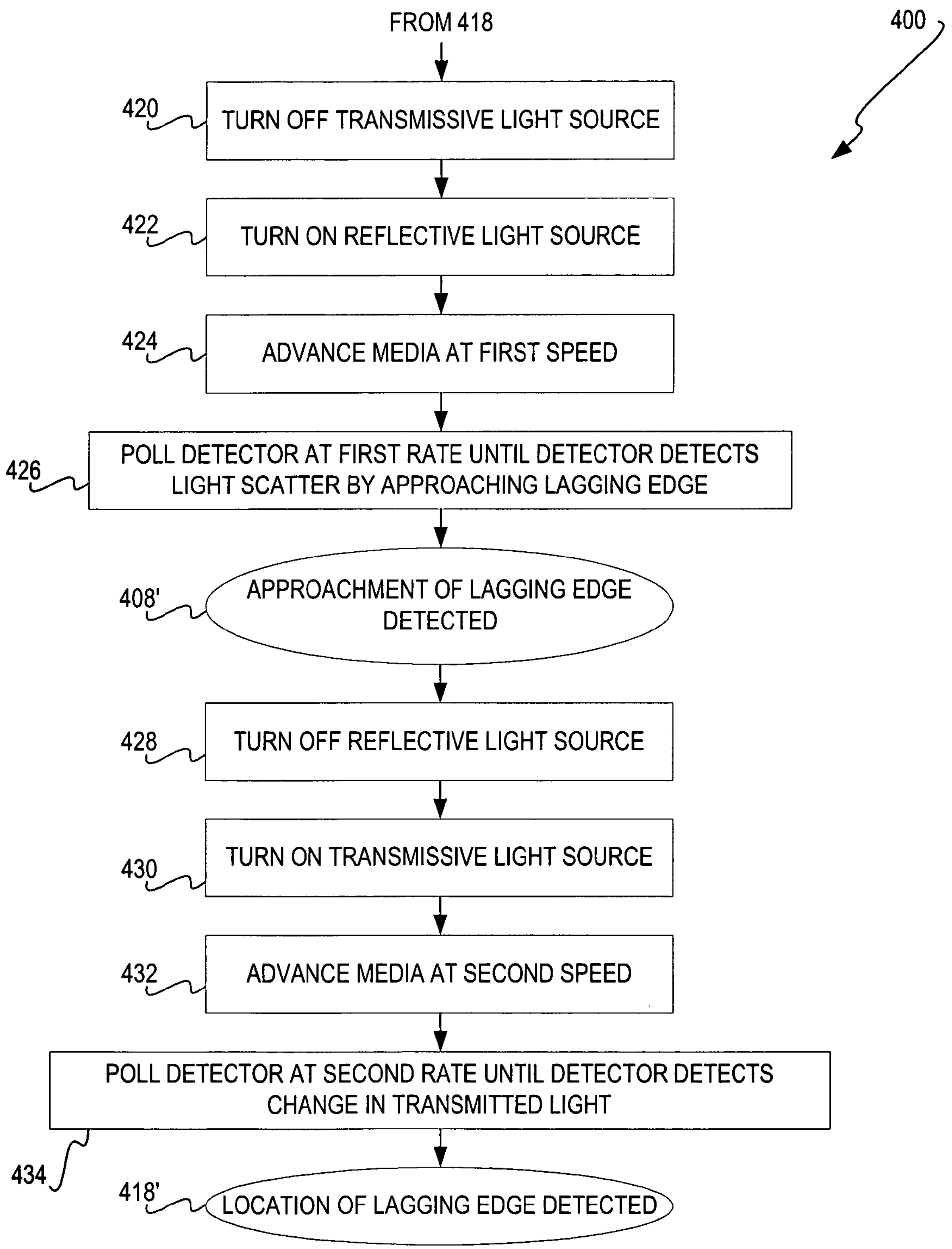

FIGS. 4A and 4B show a method 400 that can be performed by or in conjunction with the sensing mechanism 100, according to an embodiment of the invention. For instance, the method 400 may be performed by the controller 108. The reflective light source 104 is first turned on (402), where the transmissive light source 102 remains off. The media 110 is advanced at a first speed (404). The detector 106 is polled at a first rate, until the detector 106 detects light scatter by the approaching leading edge 122 of the media 110 (406). This corresponds to the situation shown in FIG. 3A, as identified in FIG. 2 by the reference number 214. The approachment of the leading edge 122 of the media 110 has thus been detected (408).

Next, the reflective light source 104 is turned off (410), and the transmissive light source 102 is turned on (412). The media can be advanced at a second speed that is less than the first speed (414), so that greater precision in locating the leading edge 122 of the media 110 is achieved. The detector 106 is polled at a second rate, greater than the first rate to also achieve greater locational precision of the leading edge 122, until the detector 106 detects a change in the transmitted light (416). This corresponds to the situation shown in FIG. 3B, as identified in FIG. 2 by the reference number 220. The location of the leading edge 122 of the media 110 has thus been detected (418).

The transmissive light source 102 is then turned off (420), and the reflective light source 104 is turned back on (422). The media 110 may again be advanced at the faster first speed (424). The detector 106 is polled at the less-frequent first rate until the detector 106 detects light scatter by the approaching lagging edge 124 of the media 110 (426). This corresponds to the situation identified in FIG. 2 by the reference number 228. The approachment of the lagging edge 124 of the media 110 has thus been detected (408').

The reflective light source 104 is again turned back off (428), and the transmissive light source 102 is again turned back on (430). The media 110 is advanced again at the slower second speed (432), to aid in precisely locating the location of the lagging edge 124 of the media 110. The detector 106 is polled at the more-frequent second rate, to also achieve greater locational precision of the lagging edge 124, until the detector 106 detects a change in the transmitted light (434). This corresponds to the situation identified in FIG. 2 by the reference number 234. The location of the lagging edge 124 of the media 110 has thus been detected (418').

Figure 5:
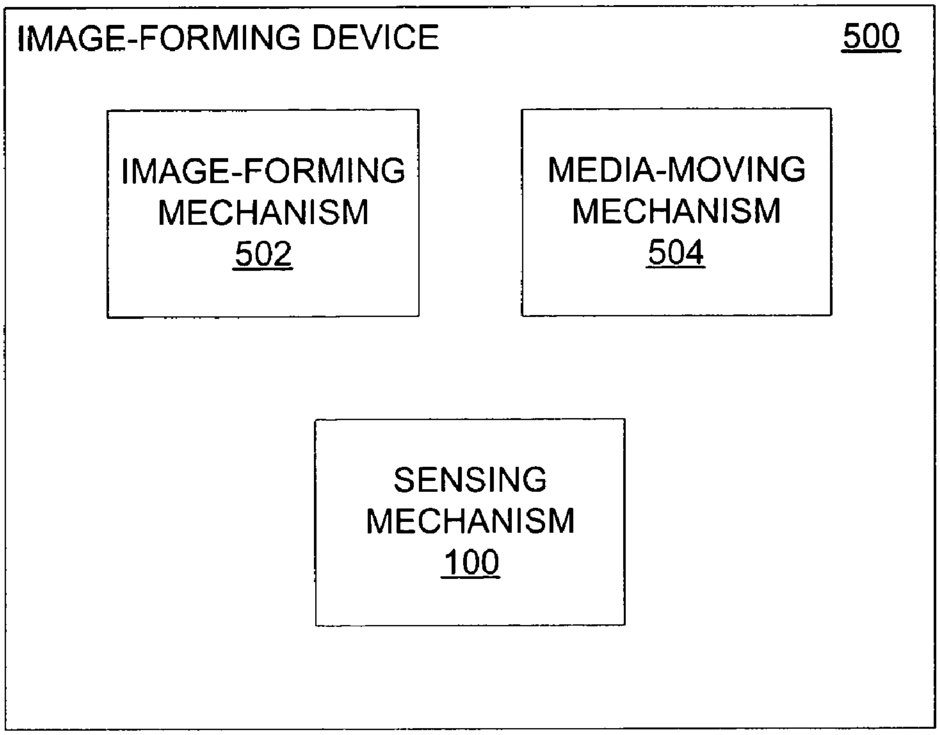
FIG. 5 is a block diagram of a representative image-forming device, according to an embodiment of the invention.

FIG. 5 shows a block diagram of a representative image-forming device 500, according to an embodiment of the invention. The image-forming device 500 is depicted in FIG. 5 as including an image-forming mechanism 502, a media-moving mechanism 504, and a sensing mechanism 100. The image-forming device 500 may also include other components, in addition to and/or in lieu of those shown in FIG. 5. The image-forming device 500 may be a laser-printing device, such as a laser printer, a fluid-ejection device, such as an inkjet-printing device like an inkjet printer, or another type of device.

The image-forming mechanism 502 includes those components that allow the image-forming device 500 to form an image on the media 110. For instance, the image-forming mechanism 502 may be an inkjet-printing mechanism, such that the image-forming device 500 is an inkjet-printing device. Furthermore, the media-moving mechanism 504 includes those components that allow the media 110 to move through the image-forming device 500, so that an image may be formed thereon. The media-moving mechanism 504 may include rollers, motors, and other types of components.

The sensing mechanism 100 can in one embodiment be the sensing mechanism 100 that has been described in previous sections of the detailed description. For instance, the sensing mechanism 100 may detect the approachment of the leading edge 122 and/or the lagging edge 124 of the media 110 based on the light 120 emitted by the light source 104 as reflected off or scattered by the edge 122 and/or the edge 124. The sensing mechanism 100 may further detect the location of the leading edge 122 and/or the lagging edge 124 based on the light 118 emitted by the light source 102 as transmitted through the edge 122 and/or the edge 124. Such edge location detection is accomplished with precision by using the light 118, where the approachment of the edge is first generally detected by using the light 120. Thus, detecting the approachment of the leading edge 122 and/or the lagging edge 124, via the light 120, serves to indicate when the light 118 should be emitted to precisely detect the location of the edge 122 and/or the edge 124.

CONCLUSION

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of the disclosed embodiments of the present invention. Therefore, it is manifestly intended that this invention be limited only by the claims and equivalents thereof.

We claim:

1. A method comprising:

turning on a light source incident to a same side of a media sheet as a detector;

detecting approachment of an edge of the media sheet by the detector detecting light emitted by the light source and reflected by the media sheet; and, upon detecting the approachment of the edge of the media sheet, turning off the light source and detecting a location of the edge by detecting light transmitted through the media sheet.

2. The method of claim 1, wherein detecting the aporoachment of the edge of the media sheet comprises detecting scatter of the light reflected by the media sheet.

3. The method of claim 1, wherein detecting the approachment of the edge of the media sheet comprises detecting light emitted towards and reflected by the media sheet.

4. The method of claim 1, wherein detecting the location of the edge comprises detecting a change in the light transmitted through the media sheet.

5. The method of claim 1, wherein detecting the edge comprises detecting light emitted through the media sheet.

6. The method of claim 1, wherein the light source is a first light source, and the method further comprises, upon detecting the approachment of the edge of the media sheet, initially turning on a second light source incident to an opposite side of the media sheet as the detector, wherein detecting the light transmitted through the media sheet comprises the detector detecting light emitted by the second light source and transmitted through the media sheet.

7. A method comprising:

turning on a first light source positioned incident to a same side of an advancing media sheet as a detector;

polling the detector at a first rate until the detector detects scatter of light emitted by the first light source and reflected by an approaching leading edge of the media sheet;

turning off the first light source;

turning on a second light source positioned incident to an opposite side of the media sheet as the detector; and, polling the detector at a second rate greater than the first rate until the detector detects a change in transmitted light emitted by the second light source and transmitted through the media sheet, wherein the change in the transmitted light corresponds to a location of the leading edge of the media sheet.

8. The method of claim 7, further comprising, after turning on the first light source, advancing the media sheet at a first speed.

9. The method of claim 8, further comprising, after turning on the second light source, advancing the media sheet at a second speed less than the first speed.

10. The method of claim 7, further comprising:

turning off the second light source;

turning on the first light source;

polling the detector at the first rate until the detector detects scatter of light emitted by the first light source and reflected by an approaching lagging edge of the media sheet;

turning off the first light source;

turning on the second light source;

polling the detector at the second rate until the detector detects a change in transmitted light emitted by the second light source and transmitted through the media sheet, wherein the change in the transmitted light corresponds to a location of the lagging edge of the media sheet.

11. The method of claim 10, further comprising, after turning off the second light source, advancing the media sheet at a first speed.

12. The media of claim 11, further comprising, after turning off the first light source, advancing the media sheet at a second speed less than the first speed.

13. A sensing mechanism for an image-forming device comprising:

a first light source positioned incident to a first side of media;

a second light source positioned incident to a second side of the media opposite of the first side of the media;

a detector positioned incident to the second side of the media to detect first light transmitted through the media as output by the first light source and to detect second light reflected off the media as output by the second light source; and, a controller to detect approachment of at least one of a leading edge and a lagging edge of the media based on the second light and to detect a location of the at least one of the leading edge and the lagging edge based on the first light.

14. The sensing mechanism of claim 13, wherein the second light source is turned on and the first light source is turned off until the approachment of the at least one of the leading edge and the lagging edge of the media has been detected.

15. The sensing mechanism of claim 14, wherein the first light source is turned on and the second light source is turned off after the approachment of the at least one of the leading edge and the lagging edge of the media has been detected, to detect the location of the at least one of the leading edge and the lagging edge.

16. The sensing mechanism of claim 15, wherein the controller is to poll the detector at a first rate until the approachment of the at least one of the leading edge and the lagging edge of the media has been detected, and thereafter is to poll the detector at a second rate greater than the first rate until the location of the at least one of the leading edge and the lagging edge has been detected.

17. The sensing mechanism of claim 15, wherein the controller is to poll the detector at a first rate while the second light source is on and at a second rate greater than the first rate while the first light source is on.

18. The sensing mechanism of claim 15, wherein the media is advanced at a first speed until the approachment of the at least one of the leading edge and the lagging edge of the media has been detected, and thereafter is advanced at a second speed less than the first speed until the location of the at least one of the leading edge and the lagging edge has been detected.

19. The sensing mechanism of claim 15, wherein the media is advanced at a first speed while the second light source is on and the media is advanced at a second speed less than the first speed while the first light source is on.

20. The sensing mechanism of claim 13, wherein the controller is to detect the approachment of the at least one of the leading edge and the lagging edge of the media based on scatter of the second light.

21. The sensing mechanism of claim 13, wherein the controller is to detect the location of the at least one of the leading edge and the lagging edge of the media based on a change in the first light.

22. The sensing mechanism of claim 13, wherein each of the first light source and the second light source comprises a light-emitting diode (LED).

23. The sensing mechanism of claim 13, wherein the first light source is aimed at a right angle to the media, and the second light source is aimed at an oblique angle to the media.

24. The sensing mechanism of claim 13, wherein the detector comprises a phototransistor.

25. An image-forming device comprising:

an image-forming mechanism to form an image on media;

a media-moving mechanism to move the media through the image-forming device; and, a sensing mechanism to detect approachment of an edge of the media based on light reflected off the media and to detect a location of the edge based on light transmitted through the media, the sensing mechanism comprising:

a first light source to generate the light transmitted through the media a second light source to generate the light reflected off the media;

a detector to detect the light transmitted through the media and the light reflected off the edge of the media; and, a controller to detect the approachment of and the location of the edge of the media, wherein the controller is to turn off the first light source, turn on the second light source, and poll the detector at a first rate until the approachment of the edge of the media has been detected.

26. The image-forming device of claim 25, wherein the controller is to turn on the first light source, turn off the second light source, and poll the detector at a second rate greater than the first rate after the approachment of the edge of the media has been detected.

27. The image-forming device of claim 26, wherein the media-moving mechanism is to move the media through the image-forming device at a first speed until the approachment of the edge of the media has been detected, and at a second speed less than the first speed after the approachment of the edge has been detected.

28. The image-forming device of claim 25, wherein the image-forming mechanism is an inkjet-printing mechanism, such that the image-forming device is an inkjet-printing device.

29. An image-forming device comprising:

means for forming an image on media;

moves means for moving the media through the image-forming device; and, means for detecting approachment of at least one of a leading edge and a lagging edge of the media based on light reflected off the media and for detecting a location of the at least one of the leading edge and the lagging edge based on light transmitted through the media, wherein the means for moving the media through the image-forming device is for moving the media at a first speed until the approachment of the at least one of the leading edge and the lagging edge of the media has been detected, and for moving the media at a second speed greater than the first speed after the approachment of the at least one of the leading edge and the lagging edge has been detected.

30. The image-forming device of claim 29, wherein the means for forming the image on the media is for ejecting ink onto the media, such that the image-forming device is an inkjet-printing device.

* * * * *